Sept. 22, 1964   KARL-AUGUST WÄCHTER   3,149,940
DUST FILTER IN SERIES WITH PARALLEL ROWS OF GAS FILTERS
Filed July 10, 1961   4 Sheets-Sheet 1

INVENTOR
Karl-August Wächter

BY Bailey, Stephens & Huettig
ATTORNEYS

Sept. 22, 1964   KARL-AUGUST WÄCHTER   3,149,940
DUST FILTER IN SERIES WITH PARALLEL ROWS OF GAS FILTERS
Filed July 10, 1961   4 Sheets-Sheet 3

INVENTOR
Karl-August Wächter

BY Bailey, Stephens & Huettig
ATTORNEYS

United States Patent Office 3,149,940
Patented Sept. 22, 1964

3,149,940
DUST FILTER IN SERIES WITH PARALLEL
ROWS OF GAS FILTERS
Karl-August Wächter, Lubeck, Germany, assignor to
Otto Heinrich Dräger, Lubeck, Germany
Filed July 10, 1961, Ser. No. 122,980
Claims priority, application Germany, July 25, 1960,
D 33,848
9 Claims. (Cl. 55—316)

This invention relates to an air filter and, in particular, is directed to a filter for filtering from air both suspended materials, such as dust, pollen, and the like, and gases.

Filters for cleaning air of dust and gas are well known. However, these filters as used to date have the dust and gas filters contained in separate housings which are connected to each other. The air being filtered flows in succession through these respective filters. Such filters have the disadvantage of requiring considerable space for the respective dust and gas filters together with their connecting pipes.

The object of this invention is to avoid the space disadvantages of the heretofore used filters and to produce a single unit containing both the dust and gas filters which is especially suitable for installation in a vehicle. According to this invention, a single housing is used with the dust filter in one portion of the housing and the gas filters adjacent the dust filter in a second portion of the housing so that air leaving the dust filter is directed to be substantially immediately introduced into the gas filters. This arrangement saves space and, in addition, the entire unit can be easily and quickly installed or removed from a vehicle. This is important inasmuch as there is only a limited space for the installation of a filter in a vehicle.

A further savings of space is obtained by giving one side of the housing a generally triangular shape, in which portion the dust filter is mounted. The second portion of the housing is of rectangular shape and contains the gas filters. While the size of the housing is thus limited to the space absolutely necessary for the installation of the filters, at the same time, the use of the air ducts or passageways of small cross-section which cause large air friction losses is avoided as the space within the housing is used for the air ducts.

A further feature of this invention lies in that suitable covered openings are provided in the wall of the housing through which the individual filters are accessible.

In a simple form of this invention, the dust filter is projected outward through the wall of the housing by means of an intake air duct. A sealing ring surrounds the wall opening and then end means are provided for urging the end of the dust filter into contact with the sealing ring.

Another feature of the invention is in that the partition baffles within the housing also serve as supports for the gas filters. These partitions have openings surrounded by sealing rings and the flat gas filters are pressed on these sealing rings. A still further feature of the invention lies in the construction of the cover for the openings in the wall of the housing by means of which the filters are accessible.

The means by which the objects of the invention are obtained are described more fully with reference to the accompanying drawings, in which.

Figure 1:
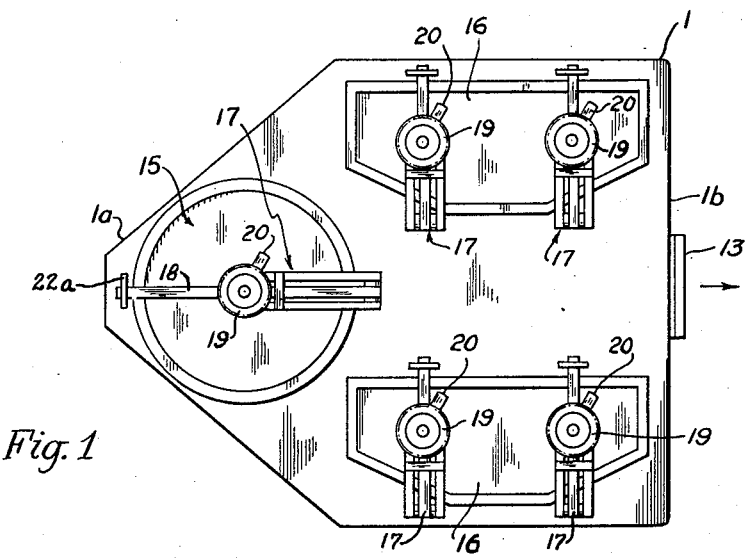
FIGURE 1 is a bottom plan view of the dust and gas filter housing.
Figure 2:
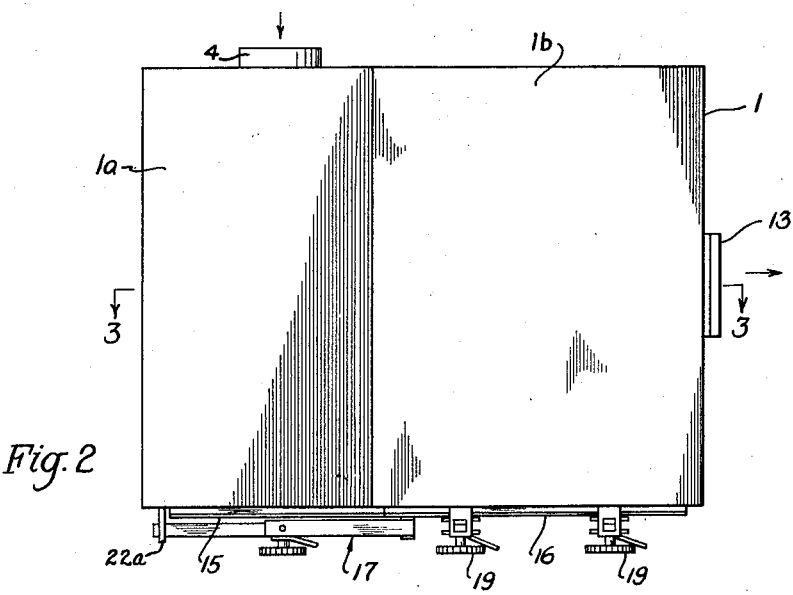
FIGURE 2 is a front elevational view of FIGURE 1.
Figure 3:
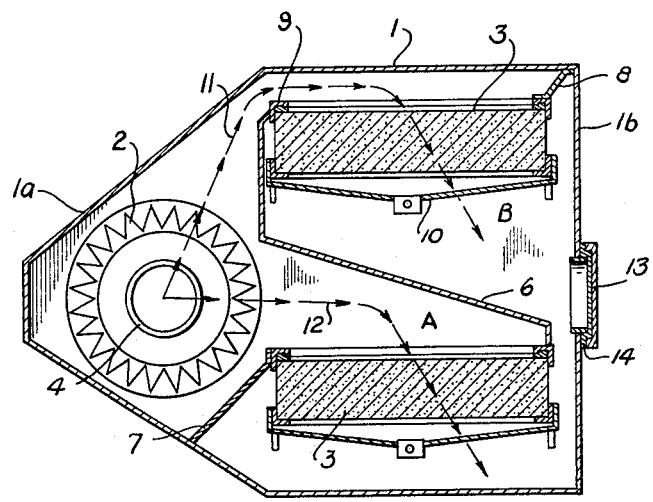
FIGURE 3 is a cross-sectional view taken on the line 3—3 of FIGURE 2.
Figure 4:
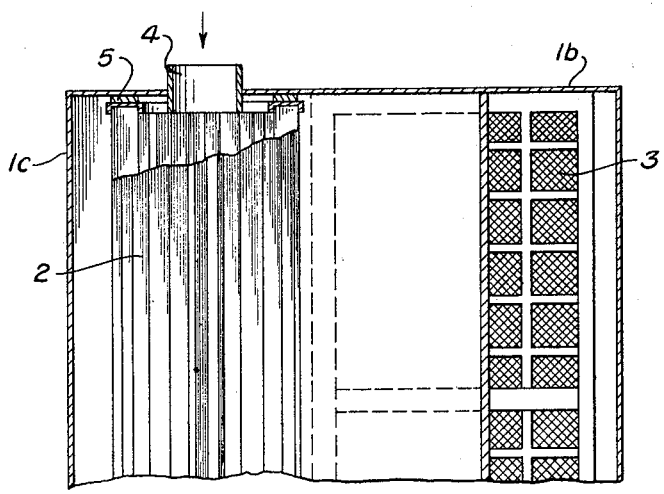
FIGURE 4 is a vertical cross-sectional view through a portion of FIGURE 3.

The housing 1 shown in FIGURES 1 and 2 contains, as shown in FIGURE 3, both a dust filter 2 and a plurality of gas filter elements 3. Dust filter 2 is in the conventional form of a cylindrical radial air flow filter. The dust filter 2 is sharply corrugated and bent into a cylinder. Housing 1 has a substantially triangularly shaped portion 1a which contains the dust filter 2. The remainder of the housing is composed of a rectangular portion 1b which contains the gas filters 3. The intake air which is to be cleaned enters air intake duct 4 and flows radially outwardly through the dust filter 2. Intake duct 4 extends through an opening in the top wall of housing portion 1a, this opening being surrounded by a sealing ring 5 inside the housing. The dust filter 2, by suitable pressure means, is urged into contact with sealing ring 5 in its position adjacent the gas filters 3.

A plurality of gas filters 3 are used, such as four in number. Each flat rectangular filter unit 3 is arranged in a row of such filters and, as shown in FIGURE 3, two parallel rows are mounted in housing portion 1b.

Within the housing are partition baffle means composed of partitions 6, 7 and 8, respectively, for directing air coming from dust filter 2 into gas filters 3. Partitions 7 and 8 have openings surrounded by sealing rings 9 against which the gas filters 3 are tightly pressed by compression means 10. The position of partitions 6, 7 and 8 is such as to form two chambers A and B separated from each other. Air leaving dust filter 2 enters chamber A and then flows as indicated by arrows 11 and 12 to and through gas filters 3 of the chamber 9. The filtered air then leaves chamber B and the filter housing through a port 13 which can be provided with a multi-port closure 14.

As shown in FIGURE 1, the bottom side of housing 1 has covers 15 and 16 for tightly closing the openings in the housing giving access to the filters. Cover 15 is of circular shape and each cover 16 of approximately rectangular shape. Each cover is fastened by a latch 17. Upon opening the covers, the filter elements can be removed. Moreover, the entire filter housing 1 can be taken out as a unit from a vehicle by merely disconnecting the air intake duct 4 and the exhaust port 13 from the vehicle, if necessary. Ordinarily, the outlet port 13 is unconnected to anything in the vehicle so that it is only necessary to disconnect air intake duct 4 to remove the filter housing.

Figure 5:
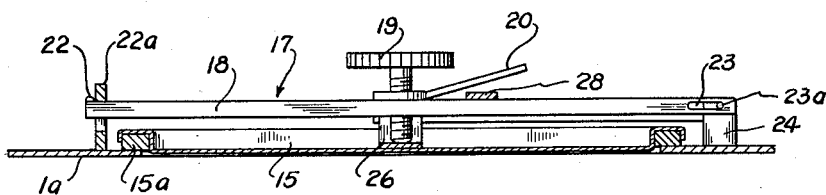
FIGURE 5 is an enlarged detail cross-sectional view through the cover for an opening in the wall of the filter housing in closed position.
Figure 6:
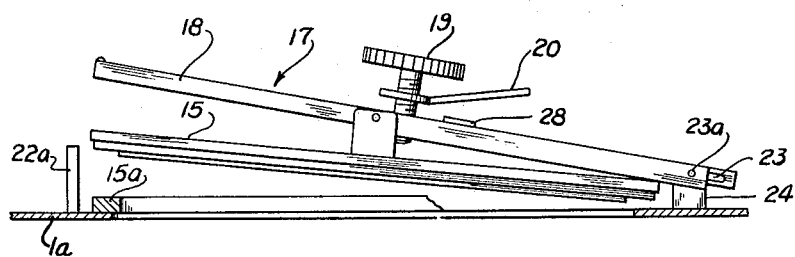
FIGURE 6 is a view similar to FIGURE 5 with the cover shown in open position.
Figure 7:
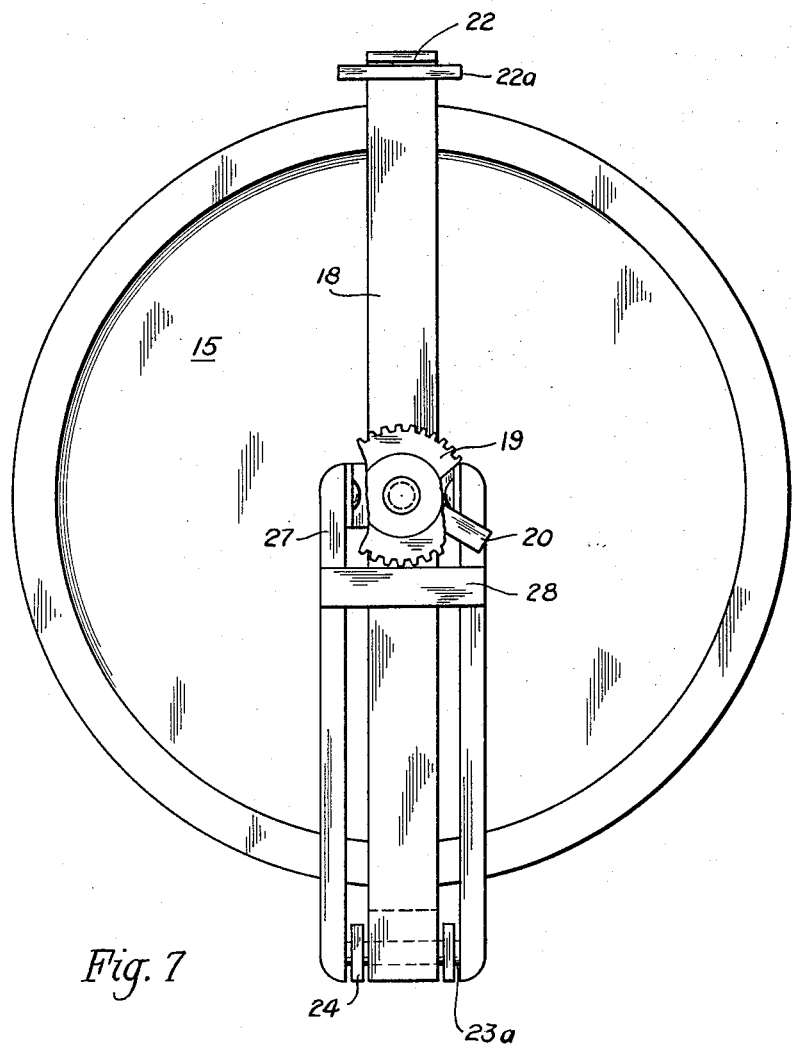
FIGURE 7 is an enlarged plan view of the cover construction shown in FIGURES 5 and 6.

The latch for each cover 15 and 16 is shown more fully in FIGURES 5, 6 and 7 with respect to the cover 15.

The opening in the wall of housing portion 1a which is to be closed by cover 15 is surrounded by a sealing ring 15a. Cover 15 is closed with the aid of a lever 18 in the middle of which is threaded a pressure member, such as a screw 19, so that the end of the screw engages a corresponding abutment on cover 15. Lock nut 20 is provided for holding screw 19 when the cover is in closed position.

The front free end 22 of lever 18 is held beneath a hook 22a secured to the wall of housing portion 1a. The opposite end of lever 18 contains an elongated slot 23 through which extends hinge pin 23a to pivotally secure lever 18 to the posts 24 secured to the housing portion 1a. The cover 15 is shown in closed position in FIGURE 5. To open the cover, screw 19 is unscrewed and lever 18 pulled back so that its front free end 22 is freed from the hook 22a.

A U-shaped member 26 fastened to cover 15 serves to connect the cover with a pair of hinged members 27. The opposite ends of the hinged members are pivotally connected to hinge pin 23a. The pair of hinged members are further connected by a strap 28 overlying lever 18. Accordingly, cover 15 is always swung into proper closing position, while at the same time, freedom of movement is given lever 18 so that it can be used to tightly close the cover over its respective opening.

It is apparent that when the cover is opened the lever 18 is first loosened and then slid rearwardly by reason of the elongated slot 23 and can be lifted along with the pair of hinged members 27 by means of the strap 28.

Having now described the means by which the objects of the invention are obtained, I claim:

1. A dust and gas filter for a vehicle comprising a housing, dust filtering means mounted longitudinally substantially entirely across one portion of said housing and having one end open to the atmosphere and the other end closed, a plurality of gas filtering means arranged in separate rows within said housing co-extensive with and adjacent said dust filter means in a second housing portion, baffle partition means between and coextensive with said rows for directing air emitted from susbtantially the entire surface area of said dust filtering means into and through the entire surface area of said gas filtering means, and outlet port means for removing the completely filtered air from said housing.

2. A dust and gas filter as in claim 1, said housing being triangularly shaped in said one housing portion, and rectangularly shaped in said second housing portion.

3. A dust and gas filter as in claim 2, further comprising an air inlet duct extending through an opening in the wall of said housing into said dust filtering means, a sealing ring mounted on said wall around said opening, and pressure means for urging said dust filtering means into contact with said sealing ring.

4. A dust and gas filter as in claim 3, said baffle partition means comprising filter walls for supporting said gas filtering means.

5. A dust and gas filter as in claim 4, said gas filtering means being flat and seated on the edges of openings in said filter walls, and sealing rings between said gas filtering means and said edges.

6. A dust and gas filter as in claim 5, further comprising a bottom wall on said housing, bottom openings in said bottom wall for the introduction into and the removal from of the dust and gas filtering means, respectively, and covers for closing said bottom openings.

7. A dust and gas filter as in claim 6, further comprising a hinged member secured to each cover and pivotally connected to said housing, a lever movably engageable with said hinged member, and hook means attached to said housing for removably securing the free end of said lever.

8. A dust and gas filter as in claim 7, further comprising an elongated slot in one end of said lever, and hinge pin means in said slot for pivotally joining said lever to said housing.

9. A dust and gas filter as in claim 8, further comprising a pressure member threaded through said lever and adapted to bear upon said hinged member for tightening said cover against said housing.

References Cited in the file of this patent
UNITED STATES PATENTS

| | | |
|---|---|---|
| 1,315,163 | Schwartz | Sept. 2, 1919 |
| 1,744,119 | Hull | Jan. 21, 1930 |
| 1,895,618 | Fedeler | Jan. 31, 1933 |
| 1,916,907 | Sargent | July 4, 1933 |
| 2,019,186 | Kaiser | Oct. 29, 1935 |
| 2,032,221 | Myers | Feb. 25, 1936 |
| 2,398,045 | Schaaf | Apr. 9, 1946 |
| 2,886,124 | Scharmer | May 12, 1959 |
| 2,929,503 | Ambruster et al. | Mar. 20, 1960 |